United States Patent [19]

Coleman

[11] Patent Number: 4,956,834
[45] Date of Patent: Sep. 11, 1990

[54] COHERENCE MULTIPLEXED OPTICAL SIGNAL TRANSMISSION SYSTEM AND METHOD

[75] Inventor: Jeffrey O. Coleman, Medina, Wash.

[73] Assignee: The Boeing Company, Seattle, Wash.

[21] Appl. No.: 296,445

[22] Filed: Jan. 12, 1989

[51] Int. Cl.⁵ .............................................. H04B 9/00
[52] U.S. Cl. ........................................... 370/1; 370/3; 370/4; 455/600; 455/617; 350/96.14; 356/345
[58] Field of Search ................................ 370/1, 2, 3, 4; 455/600, 611, 612, 617; 356/345; 358/96.13, 96.14, 96.11

[56] References Cited

U.S. PATENT DOCUMENTS

| | | |
|---|---|---|
| 3,334,538 | 8/1967 | Steinhausen . |
| 3,597,047 | 8/1971 | Carbrey et al. . |
| 3,670,166 | 6/1972 | Kaminow . |
| 3,838,278 | 9/1974 | Duguay et al. . |
| 3,849,604 | 11/1974 | Benes et al. . |
| 4,182,935 | 1/1980 | Chown . |
| 4,553,101 | 11/1985 | Mathis . |
| 4,630,254 | 12/1986 | Tseng . |
| 4,799,797 | 1/1989 | Huggins . |
| 4,860,279 | 8/1989 | Falk et al. .................... 370/1 |
| 4,866,698 | 9/1989 | Huggins et al. ............. 370/1 |
| 4,882,775 | 11/1989 | Coleman ........................ 370/1 |

*Primary Examiner*—Donnie L. Crosland
*Attorney, Agent, or Firm*—Christensen, O'Connor, Johnson & Kindness

[57] ABSTRACT

A transmitter includes a coupler having N input prots and N output ports, N being the number of input signals to be multiplexed. The coupler has a unitary coupling matrix, and receives N input signals at its input ports to produce N intermediate transmitting signals at its output ports. The intermediate transmitter signals are subjected to different time delays and then combined into a composite optical signal launched onto an optical bus. At the receiver, the composite signal is divided into N intermediate receiver signals, the intermediate receiver signals are time delayed in the same manner as in the transmitter, and then coupled to input ports of a receiver coupler that has a coupling matrix equal to the transpose of the transmitter's coupling matrix. The output port signals may then be detected and processed to decouple the N data channels.

12 Claims, 3 Drawing Sheets

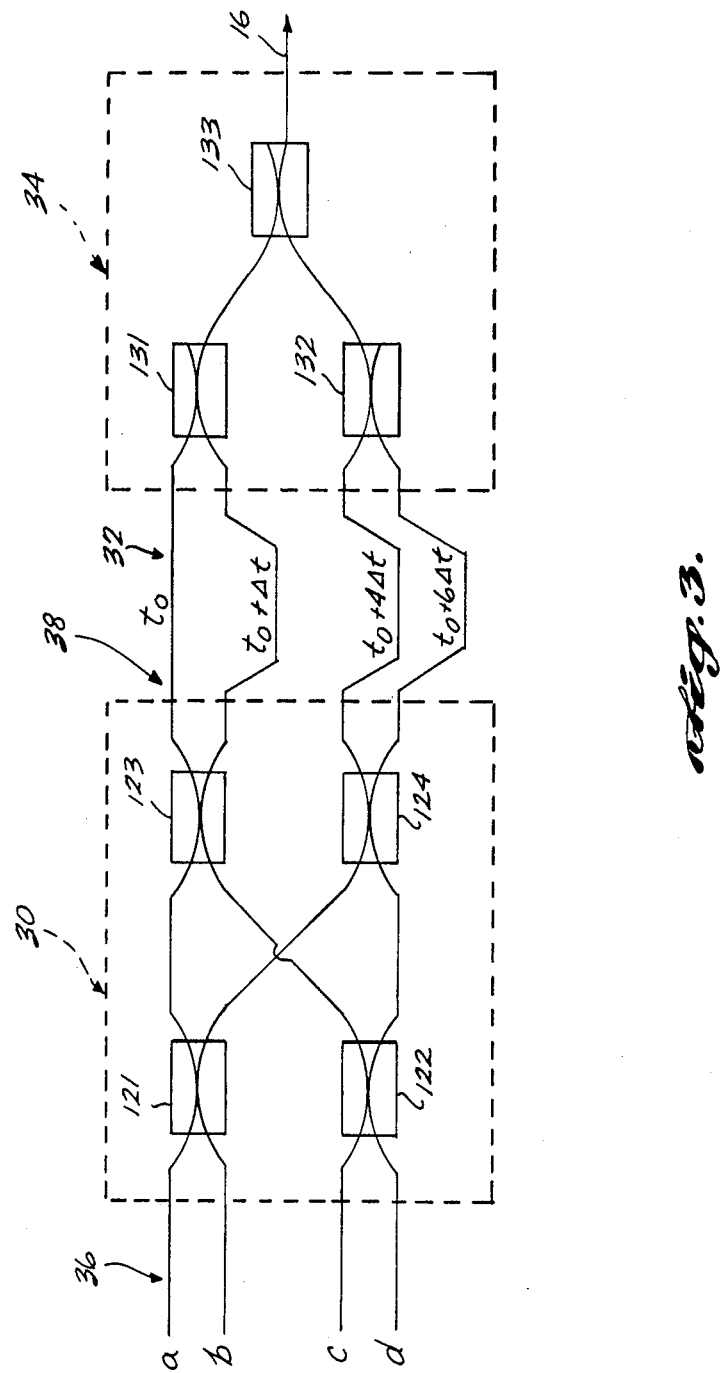

COHERENCE MULTIPLEXED OPTICAL SIGNAL TRANSMISSION SYSTEM AND METHOD

FIELD OF THE INVENTION

The present invention relates to optical signal transmission systems and, in particular, to an improved technique for producing a coherence multiplexed signal transmission system in which a plurality of optical signals are multiplexed onto a common optical bus.

BACKGROUND OF THE INVENTION

In recent years, fiber-optic cables have been increasingly used for communications, particularly in telephone systems. Reasons for this increased usage include the facts that optical fibers are lighter in weight and less expensive than electrical conductors for the same information capacity, and are not subject to electrical interference. Typically, a communication system includes a light source such as a laser diode or an LED, and a photodetector such as a photodiode, connected through a single mode or multimode fiber-optic cable. Information is typically transmitted in digital form, as a series of light pulses that form a bit stream.

In order to increase the information-carrying capacity of a fiber-optic cable, frequency and time division multiplexing techniques have been widely explored. Examples of prior art frequency division multiplexing optical communication systems are described in U.S. Pat. Nos. 4,326,243 and 4,592,043. However, a number of problems have been encountered in implementing such systems. These problems include frequency variations of the semiconductor light sources, matching of the multiplexer and demultiplexer coupling frequencies, and the need for relatively large channel spacing to accommodate aging effects and manufacturing tolerances of semiconductor lasers.

Coherence multiplexing is a comparatively new technique for carrying multiple data channels on a single optical fiber or waveguide. In a coherence multiplexed system, the transmitted information is carried in the structure of the complex autocorrelation or self-coherence function of the transmitted optical signal. The advantages of coherence multiplexing are that it uses optical signal processing structures that are inherently simpler than those required for frequency division multiplexing, and uses electronic signal processing structures that are simpler than those generally associated with time division multiplexing.

Prior coherence multiplexed optical transmission systems have modulated information onto a carrier by passing the carrier through an unequal arm length Mach-Zehnder interferometer, and by using a modulation signal to vary the optical path length of one of the interferometer arms. Although this technique is effective, the requirement for electro-optic modulators requires the transmitter to be constructed in an electro-optic substrate. Development of a coherence multiplexed system that did not require electro-optic modulators would therefore allow the system to be fabricated in a wider variety of materials.

SUMMARY OF THE INVENTION

The present invention provides a coherence multiplexed optical signal transmission system and method for transmitting a plurality of input signals over a common optical bus. The invention does not require the use of electro-optic modulators, and can therefore be implemented without using electro-optic substrates.

In a preferred embodiment, the system comprises a transmitter and a receiver coupled by the common optical bus. The transmitter comprises coupling means, delay means and combining means. The transmitter coupling means has N input ports and N output ports, N being the number of input signals. The transmitter coupling means has a substantially unitary coupling matrix. The input signals are received at the respective input ports, such that N intermediate signals are produced at the output ports. The delay means delays the N intermediate transmitter signals using a set of first time delays, such that there is a delay difference between each pair of first time delays, and such that the difference between each pair of delay differences is greater than the coherence length of each input signal. The combining means combines the intermediate signals to produce a composite signal that is coupled into the common optical bus.

The receiver comprises dividing means, delay means and coupling means. The dividing means receives the composite signal from the bus, and divides it into N intermediate receiver signals. The intermediate receiver signals are then delayed using a set of second time delays substantially equal to the first time delays. The receiver coupling means has N input ports connected to receive the respective intermediate receiver signals and N output ports, and has a coupling matrix substantially equal to the transpose of the coupling matrix of the transmitter coupling means. A set of N output signals are produced at their respective output ports of the receiver coupling means, the output signals corresponding to the input signals.

In a preferred embodiment, the receiver further comprises N photodetectors connected to receive the N output signals and convert them into corresponding electrical detection signals. The receiver may also comprise means for producing a reference signal equal to the sum of the detection signals scaled by $(N-1)/N^2$ to produce a reference signal that is subtracted from each detection signal, to thereby reduce crosstalk in the respective channels.

BRIEF DESCRIPTION OF THE DRAWINGS

FIG. 3 is an optical schematic of a preferred embodiment of the transmitter for a four-channel system.

DETAILED DESCRIPTION OF THE DRAWINGS

Figure 1:
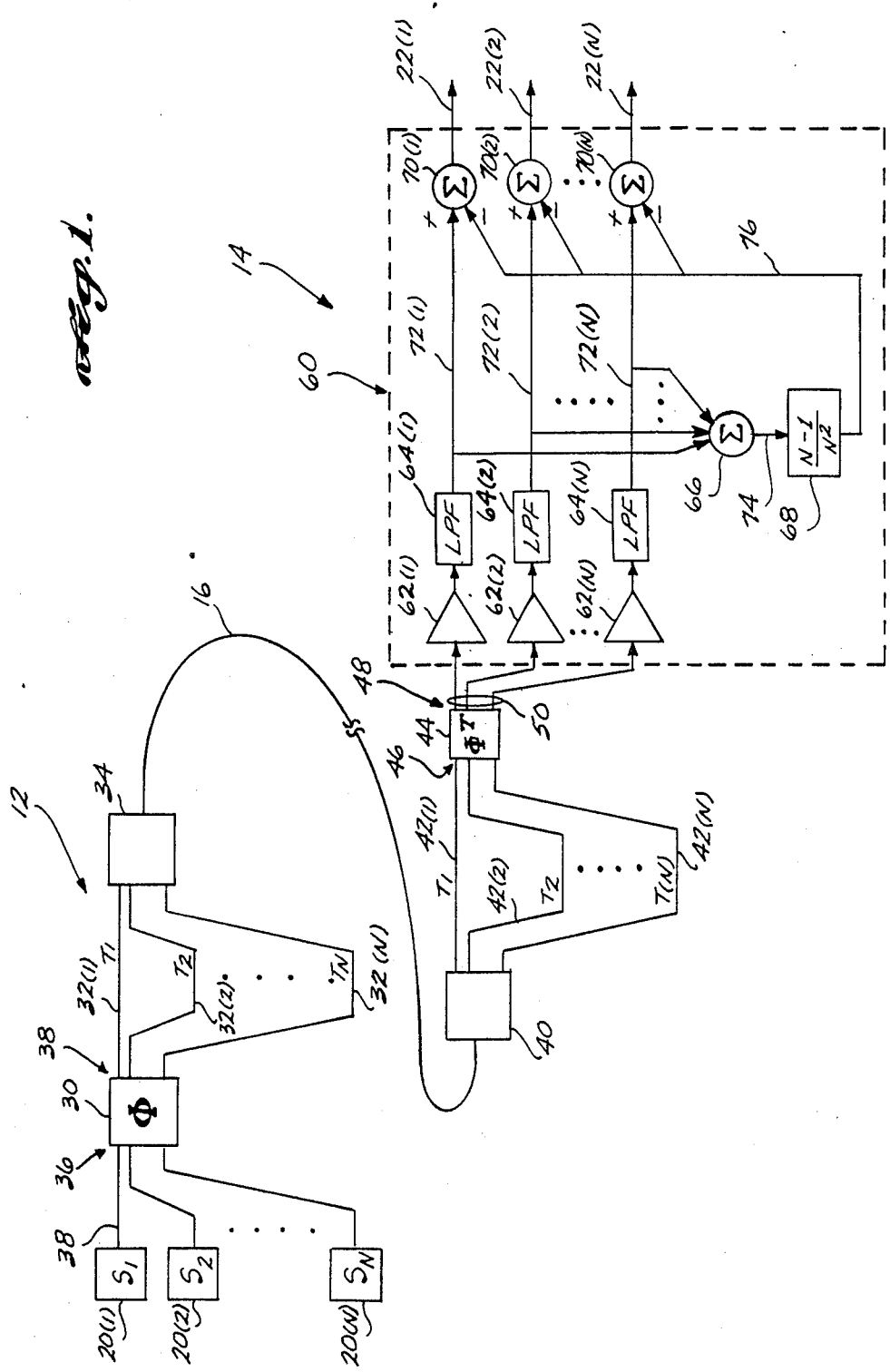
FIG. 1 is an optical schematic illustrating a preferred embodiment of the optical transmission system of the present invention.

FIG. 1 schematically illustrates a coherence multiplexed optical transmission system according to the present invention. The system comprises transmitter 12 and receiver 14 connected by optical bus 16 that may comprise a single mode fiber-optic cable. Transmitter 12 receives N optical input signals from optical sources 20(1)–20(N), and multiplexes the input signals to produce a composite optical signal on bus 16. Receiver 14 receives the composite optical signal and demultiplexes the signal to produce N electrical output signals on lines 22(1)–22(N), such that the output signals correspond to the input signals provided by sources 20.

Transmitter 12 comprises N-by-N coupler 30, delay lines 32(1)–32(N), and combiner 34. Coupler 30 comprises N input ports 36 and N output ports 38. Input ports 36 are connected to optical sources 20, such that each input port receives one of the optical input signals. Output ports 38 of coupler 30 are connected to respective delay lines 32, with the other ends of delay lines 32 being connected to combiner 34. The coupler distributes the optical input signal at each input port to all of the output ports. Thus the signal on each delay line 32 includes components from each of the optical input signals.

Receiver 14 comprises power splitter 40, delay lines 42(1)–42(N), N-by-N coupler 44, and electronics module 60. Splitter 40 receives the composite signal on fiber-optic cable 16, and divides the signal between delay lines 42(1)–42(N). Coupler 44 is similar to coupler 30, includes N input ports 46 and N output ports 48, and distributes the signal at each input port to all of the output ports. Delay lines 42 are coupled to respective input ports 46, and output ports 48 are connected to respective fiber-optic cables or waveguides 50 that are in turn coupled to the electronics module.

The electronics module comprises photodetectors 62(1)–62(N), lowpass filters 64(1)–64(N), summing circuit 66, scaling circuit 68, and differencing circuits 70(1)–70(N). Photodetectors 62 are coupled to the respective fiber-optic cables 50, and convert the optical signals thereon to corresponding electrical detection signals on lines 72(1)–72(N). Each detection signal on lines 72 forms one of the inputs to a respective differencing circuit 70. Summing circuit 66 sums the detection signals to produce a summation signal on line 74 that is input to scaling circuit 68. Scaling circuit 68 scales the summation signal by the factor $(N-1)/N^2$ to produce a reference signal on line 76, the reference signal forming the other input to each of the differencing circuits. Differencing circuits 70 produce the electrical output signals on lines 22. In general, the summing, scaling and differencing operations illustrated in electronics module 60 can be implemented in either analog or digital form.

Each delay line 32 in transmitter 12 has a predetermined optical path length, i.e., each delay line 32 delays the optical signal passing through it by a predetermined time delay. The time delays are selected such that there is a "delay difference" between each pair of time delays (a total of $N(N-1)/2$ delay differences), and such that the difference between each pair of delay differences is greater than the coherence length of each of the optical input signals. In receiver 14, the optical path lengths and time delays of delay lines 42 match those of delay lines 32 in the transmitter. In addition, coupler 44 should match coupler 30 in a particular sense: the gain and phase shift of coupler 44 from input port i to output port j should be substantially the same as the gain and phase shift of coupler 30 from input port j to output port i. This requirement is equivalent to the requirements that both coupling matrices be unitary, and that the coupling matrix of coupler 44 be the transpose of the coupling matrix of coupler 30. Couplers 30 and 44 can be logical mirror images, and can in fact be physically identical, with inputs and outputs reversed, if suitable restrictions are imposed. The operation of the system shown in FIG. 1 can best be understood by considering the simple two-channel system illustrated in FIG. 2. The system of FIG. 2 includes transmitter 80 and receiver 82 connected by fiber-optic cable 84. Transmitter 80 comprises two-by-two coupler 90, delay lines 92(1) and 92(2), and combiner 94, connected in the same manner as in the system of FIG. 1. Receiver 82 comprises power splitter 100, delay lines 102(1) and 102(2), two-by-two coupler 104, and electronics module 106. The electronics module comprises photodetectors 108(1) and 108(2), differencing circuits 110(1) and 110(2), summing circuit 112 and scaling circuit 114. For simplicity, the low-pass filters have been omitted from FIG. 2.

Coupler 90 may be a conventional X-coupler having the unitary coupling matrix $\Phi$:

$$\Phi = \frac{1}{\sqrt{2}} \begin{bmatrix} 1 & 1 \\ 1 & -1 \end{bmatrix} \tag{1}$$

The scaler factor $1/\sqrt{2}$ is unimportant for understanding the operation of the system, and is therefore omitted in the discussion below. The optical signals appearing at the input ports of coupler 90 will be designated a and b. The signals at the output ports of coupler 90 are equal to the input signal vector multiplied by coupling matrix $\Phi$. Thus the output signals of coupler 90 are $a+b$ and $a-b$, as shown on FIG. 2. Delay lines 92 cause the $a-b$ signal to be delayed with respect to the $a+b$ signal, and in FIG. 2 such delay is indicated by the use of primes. Thus the input signals to combiner 94 are $a+b$ and $a'-b'$, and ignoring power losses, the output of combiner 94 is $a+b+a'-b'$. Again ignoring power losses, this is the signal that arrives at power splitter 100 of receiver 82. Power splitter 100 divides the $a+b+a'-b'$ signal between delay lines 102(1) and 102(2), with the result that the signals appearing at the input ports of coupler 104, again ignoring common power losses, are $a+b+a'-b'$ and $a'+b'+a''-b''$. The double primes represent two time delays, it being recalled that the differential delays produced by delay lines 92 are substantially identical to the differential delays produced by delay lines 102.

Figure 2:
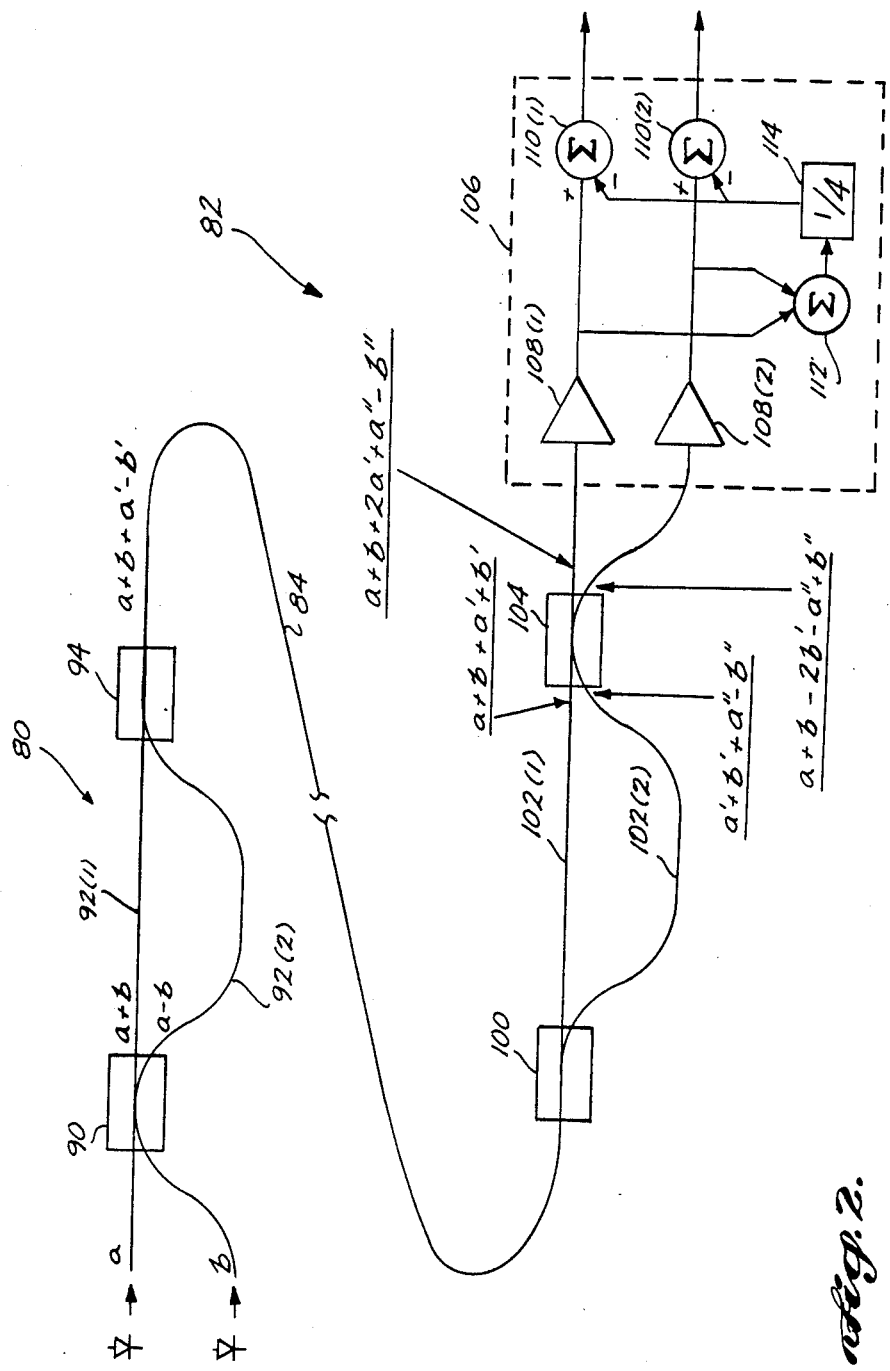
FIG. 2 is an optical schematic of a two-channel system according to the present invention.

The coupling matrix of coupler 44 is $\Phi^T$, the transpose of coupling matrix $\Phi$ of X-coupler 90. Referring to Equation 1, for this simple two channel case, $\Phi$ and $\Phi^T$ are identical to one another. Thus when the signals described above are input to X-coupler 104, the output signals are once again found by applying coupling matrix $\Phi$ to the input signal vector. The result is that the signals at the output ports of X-coupler 104 are equal to $a+b+2a'+a''-b''$ and $a+b-2b''-a''+b''$. To determine the optical power produced by the signals, note that the two a' signals produced at the upper output port in FIG. 2 are coherent with respect to one another, and thus constructively interfere to produce a total power of $4P_a$, where $P_a$ is the power associated with signal a, neglecting common system losses. Similarly, the pair of b' terms produced at the lower output port produce optical power proportional to $4P_b$. Furthermore, unprimed, singly primed and doubly primed terms are all incoherent with respect to one another, because the delay differences produced by the transmitter and receiver delay lines are longer than the coherence length of either of the optical input signals. Thus these terms add incoherently, i.e., their power add. As a result, the total power at the upper output port is $6P_a+2P_b$, while the total power at the lower output port is $6P_b+2P_a$. Since photodetectors 108 detect optical power rather than amplitude, these terms also represent the relative strengths of the signals at the outputs of the respective photodetectors. These signals are summed and scaled by ¼ to produce a reference signal equal to $2P_a+2P_b$, which when subtracted from the respective signals, produce outputs $4P_a$ for the upper channel and $4P_b$ for the lower channel. Thus the upper channel output signal depends only upon input signal a, and the lower channel output signal depends only upon input signal b.

FIG. 3 illustrates further details of a preferred embodiment of transmitter 12. In the illustrated four-channel embodiment, coupler 30 comprises four X-couplers 121–124 connected as indicated. X-couplers 121 and 122 receive input signals a, b and c, d, respectively, and combine them as indicated above in Equation 1. One of the outputs from coupler 121 is connected to one of the inputs of coupler 123, while the other output of coupler 121 is connected to one of the inputs of coupler 124. The outputs of coupler 122 are routed in a similar manner. As a result of this arrangement, the four signals produced at output ports 38 are proportional to $a+b+c+d$; $a+b-c-d$; $a-b+c-d$; and $a-b-c+d$. This arrangement therefore has the unitary coupling matrix $\Phi$:

$$\Phi = \frac{1}{2}\begin{bmatrix} 1 & 1 & 1 & 1 \\ 1 & 1 & -1 & -1 \\ 1 & -1 & 1 & -1 \\ 1 & -1 & -1 & 1 \end{bmatrix} \quad (2)$$

As indicated above, the delay lines 32 are selected such that the delay differences between pairs of delays differ by a minimum amount based upon the coherence length of the optical input signals a–d. Letting this minimum amount be designated $\Delta t$, the indicated delay line lengths of $T_0$; $T_0+\Delta t$; $T_0+4\Delta t$; and $T_0+6\Delta t$ produce six delay differences: $\Delta t$, $2\Delta t$, $3\Delta t$, $4\Delta t$, $5\Delta t$ and $6\Delta t$, all differing from one another by at least $\Delta t$. It can therefore be seen that the distinct delay difference requirement has been satisfied by this choice of time delays. FIG. 3 also illustrates a preferred embodiment for combiner 34 comprising three X-couplers 131-133 connected in the indicated tree-like arrangement.

Referring again to FIG. 1, let the complex element $\Phi_{ij}$ of the coupling matrix $\Phi$ of coupler 30 represent the amplitude gain and phase shift of the coupler path from source j to delay line i. The ideal combiner 34 and the ideal splitter 40 have amplitude gains of $1/\sqrt{N}$ in each path. The total complex amplitude gain experienced by optical signals traveling from source m through delay lines $t_i$ and $t_j$ to detector k is therefore $$\frac{1}{N}\Phi_{im}\Phi_{jk} \quad (3)$$

For optical signals originating at source m and terminating at detector k, there are $N^2$ possible paths, one of delay $2t_i$ for each i, and two of delay $t_i+t_j$ for each i, j pair, where i varies from one to N, and j varies from one to $i-1$. The power gain associated with the path of delay $2t_i$ is just the squared magnitude of the complex amplitude gain, i.e., $$\left|\frac{1}{N}\Phi_{im}\Phi_{ik}\right|^2 \quad (4)$$

Signals arriving via the two paths of length $t_i+t_j$ add coherently, so the power gain associated with these paths is $$\left|\frac{1}{N}\Phi_{im}\Phi_{jk} + \frac{1}{N}\Phi_{jm}\Phi_{ik}\right|^2 \quad (5)$$

Signals arriving via any two different delays are mutually incoherent, so the average power gains associated with these delays simply add. Thus the total average power gain $G_{km}$ from source m to detector k may be written $$G_{km} = \sum_i \left|\frac{1}{N}\Phi_{im}\Phi_{ik}\right|^2 + \sum_i \sum_{j<i} \left|\frac{1}{N}\Phi_{im}\Phi_{jk} + \frac{1}{N}\Phi_{jm}\Phi_{ik}\right|^2 \quad (6)$$

Equation 6 can be algebraically manipulated to produce $$G_{km} = \frac{1}{N^2}\left[\left|\sum_i \Phi_{ik}^* \Phi_{im}\right|^2 + \sum_i \sum_{j\neq i} |\Phi_{im}|^2 |\Phi_{jk}|^2\right] \quad (7)$$

Since the matrix $\Phi$ is unitary, the first sum in Equation 7 is equal to $\delta_{km}$, because that sum is just an inner product of columns k and m of $\Phi$. In addition, assuming that each of couplers 30 and 44 distributes power from each of its input ports uniformly across its output ports, each element of $\Phi$ will have a squared magnitude $1/N$. Equation 7 can therefore be written as $$G_{km} = \frac{1}{N^2}\left[\delta_{km} + \frac{N-1}{N}\right] \quad (8)$$

The k-th detected power $PD_k$ in terms of source powers $PS_m$ is $$PD_k = \frac{1}{N^2}\left[PS_k + \frac{N-1}{N}\sum_{m=1}^{N} PS_m\right] \quad (9)$$

Letting parameter k in equation 9 vary from 1 to N produces a set of N equations that can be solved algebraically to produce $$\frac{PS_k}{N^2} = PD_k - \frac{N-1}{N^2}\sum_{m=1}^{N} PD_m \quad (10)$$

Thus if the output powers are summed and scaled as indicated in Equation 10, a measure of the power associated with source k is determined.

Referring again to FIG. 1, the polarization of the incoming composite signal at receiver 14 must be appropriate for the receiver waveguide structures. Polarization preserving fiber or polarization reconstruction elements may therefore be required. Although in theory the described system could be used to transmit analog signals, imperfect components would likely leave unacceptable crosstalk between channels for many applications. However, residual crosstalk is less consequential for a digital communication system. In a digital system, each optical source is simply on-off keyed to transmit data, and the receiver outputs are compared to thresholds. The lowpass filters on the photodetector outputs should be matched to the shape of the transmitted power pulses.

The optical path lengths of delay lines 32 and 42 are preferably as well matched as possible, to at least within the shortest input signal coherence length. In addition, the phase shifts of the various transmitter and receiver paths through the delay lines and couplers are preferably matched to within a few degrees of phase. In light of these requirements, a preferred embodiment is one in which the optical components are fabricated as waveguides using integrated optic technology, and in which the coherence lengths of the optical sources are short. For such an integrated optic embodiment, narrowband (e.g., superluminescent) LEDs are therefore preferred. It may be possible to integrate optical sources and transmitter waveguide structures onto a single substrate, and it may likewise be possible to integrate the photodetectors and receiver waveguide structures onto a single substrate.

In the embodiment shown in FIG. 1, crosstalk is reduced or eliminated by subtracting the reference signal on line 76 from each of the individual filtered signals. An alternate way to remove crosstalk is to make it irrelevant by forcing it to be constant. If a constant weight block error correcting code is used, an entire code word may be sent at once on the N parallel channels, and the constant weight property will force the crosstalk term to remain a constant. This allows the lowpass filter outputs to be compared to a constant threshold, i.e., summing circuit 66 and scaling circuit 68 are unnecessary. Another technique for crosstalk reduction is to include a reference channel whose source intensity is adjusted so that the total optical energy of the input signals is constant.

While the preferred embodiments of the invention have been described, variations will be apparent to those skilled in the art. Accordingly, the scope of the invention is to be determined by reference to the following claims.

The embodiments of the invention in which an exclusive property or privilege is claimed are defined as follows:

1. A coherence multiplexed optical signal transmission system for transmitting a plurality of input signals over a common optical bus, each input signal having a coherence length, the system comprising:

a transmitter comprising transmitter coupling means, transmitter delay means and combining means, the transmitter coupling means having N transmitter input ports and N transmitter output ports, N being the number of input signals, the transmitter coupling means having a substantially unitary coupling matrix, the transmitter coupling means further comprising means for coupling each input signal to a different transmitter input port, whereby N intermediate transmitter signals are produced at the respective transmitter output ports, the transmitter delay means including means for time delaying the intermediate transmitter signals using a set of first time delays, such that there is a delay difference between each pair of first time delays, and such that the difference between each pair of delay differences is greater than the coherence length of each input signal, the combining means comprising means for combining the transmitter intermediate signals to produce a composite signal, and for coupling the composite signal into the common optical bus;

a receiver comprising dividing means, receiver delay means and receiver coupling means, the dividing means being coupled to the common optical bus for receiving the composite signal therefrom, and including means for dividing the composite signal into N intermediate receiver signals, the receiver delay means comprising means for time delaying the receiver intermediate signals using a set of second time delays substantially equal to said first time delays, the receiver coupling means having N receiver input ports connected to receive the respective receiver intermediate signals from the receiver delay means and N receiver output ports, the receiver coupling means having a coupling matrix that is substantially equal to the transpose of the coupling matrix of the transmitter coupling means, whereby a set of N optical output signals are produced at the respective output ports of the receiver coupling means, such that the optical output signals correspond to the input signals.

2. The system of claim 1, wherein the receiver further comprises N photodetectors connected to receive the respective N optical output signals, each photodetector converting its associated output signal into a corresponding electrical detection signal, and means for producing the output signals from the detection signals.

3. The system of claim 2, wherein the receiver further comprises means for providing a reference signal, and means for subtracting the reference signal from each detection signal to produce the associated output signal.

4. The system of claim 3, wherein the means for providing a reference signal comprises means for summing the detection signals to produce a sum signal, means for scaling the sum signal by $(N-1)/N^2$ to produce the reference signal.

5. The system of claim 3, wherein the reference signal has a constant level.

6. The system of claim 3, wherein the receiver further comprises lowpass filter means for lowpass filtering each detection signal.

7. A coherence multiplexed optical signal transmission method for transmitting a plurality of N input signals over a common optical bus, the method comprising:

combining the input signals to produce N intermediate transmitter signals such that the coupling between input signals and intermediate transmitter signals is represented by a unitary coupling matrix;

time delaying the intermediate transmitter signals using a set of first time delays, such that there is a delay difference between each pair of first time delays, and such that the difference between each pair of delay differences is greater than the coherence length of each input signal;

combining the transmitter intermediate signals to produce a composite signal;

coupling the composite signal into the common optical bus;

receiving the composite input signal from the common optical bus and dividing the composite input signal to produce N intermediate receiver signals;

time delaying the intermediate receiver signals using a second set of second time delays substantially equal to said first time delays; and combining the intermediate receiver signals to produce N output signals, such that the coupling between the intermediate receiver signals and the output signals is represented by a unitary coupling matrix.

8. The method of claim 7, comprising the further steps of converting each output signal into a corresponding electrical detection signal, and processing each detection signal to produce an associated output signal.

9. The method of claim 8, wherein the processing step comprises subtracting a reference signal from each detection signal to produce the associated output signal.

10. The method of claim 9, wherein the reference signal is produced by summing the detection signals to produce a sum signal and scaling the sum signal by $(N-1)/N^2$ to produce the reference signal.

11. The method of claim 9, wherein the reference signal has a constant level.

12. The method of claim 9, comprising the further step of lowpass filtering each detection signal.

* * * * *